United States Patent Office 3,600,476
Patented Aug. 17, 1971

3,600,476
**METHOD FOR MANUFACTURE OF LIGHT
WEIGHT AGGREGATES**
Takamura Suzuki, Tokyo, and Haruo Inagaki, Shoji Shishido, and Tadahiko Ara, Yokohama, Japan, assignors to Kanagawa Prefectural Government, Yokohama, Japan
No Drawing. Filed Sept. 10, 1969, Ser. No. 856,819
Claims priority, application Japan, Sept. 18, 1968,
43/66,976
Int. Cl. C04b *31/00*
U.S. Cl. 263—52                         8 Claims

ABSTRACT OF THE DISCLOSURE

A method for the manufactuer of coated-type light weight aggregates which comprises mixing a siliciferous material, particularly a material such as fly ash which in itself is low in plasticity, with sludge from a sewage-treating plant and, if necessary, with sodium silicate or the like as an auxiliary binder, granulating the resultant mixture into pellets, and burning the pellets in a rotary kiln.

DETAILED DESCRIPTION OF THE INVENTION

This persent invention relates to a method for the manufacture of light weight aggragates, and particularly to a method of making light weight aggregates by using a siliciferous material, such as fly ash which in itself is low in plasticity, shale, clay, or the like, and sludge from a sewage-treating plant as raw materials.

So far, in the case of making light weight aggregates by using shale or clay as raw material, it was possible to effect burning in either of a rotary kiln and a sinter grate, whereas, in the case of using fly ash as raw material, burning had to be effected in a sinter grate.

Light weight aggregates manufactured by using a rotary kiln are of the coated type in which the surface is covered with a dense skin, so they are low in water absorption and are used as structural concrete, whereas light weight aggregates manufactured by using a sinter grate are of the crushed type, so they are high in water absorption and are used mainly for the manufacture of concrete blocks.

One of the reasons why fly ash cannot be burnt in a rotary kiln is that pellets made of only fly ash are low in green strength, so they are easily worn away or broken by the rotation of a rotary kiln, making it difficult to finish them into products in the desired shape.

It is one object of this invention to provide a method of making coated-type light weight aggregates from raw material of low plasticity such as fly ash by using a rotary kiln.

It is another object of this invention to provide a method of making useful light weight aggregates by using sludge from a sewage-treating plant.

Other objects and characteristic features of the present invention will become apparent from the complete description given hereunder.

The present inventors found that the dried bodies of pellets made by mixing fly ash from a thermal power plant with sludge from sewage-treating plant have very high elasticity. That is to say, the dried bodies of pellets made of only fly ash were easily broken when dropped from only a height of 15 cm., whereas the dried bodies of pellets made by adding sludge to the fly ash were not broken even when dropped from a height of a few meters. Also, it became clear that, in the dried bodies of pellets made by adding sludge to a siliciferous material other than the fly ash, such as, for example, shale, clay, or the like, the strength increased much more than in the dried bodies of pellets made of only the siliciferous material without addition of sludge.

Sludge has a binding property similar to that of clay, so it appears that, when sludge is mixed with a material such as fly ash, the fibers in the sludge get in an entangled state into between the particles of the material to link them together more firmly. Accordingly, even when the dried bodies of pellets so obtained are burnt, the strength thereof becomes the lowest in the vicinity of 600° C. at which temperature the organic substances in the sludge are burnt up; but, because the sludge in the particles still has the function as a binder, the resultant light weight aggregates are far superior in strength to those obtained without addition of sludge.

As stated above, according to the present invention, it is possible, by adding sludge to a siliciferous material such as fly ash which is lacking in plasticity and the burning of which in a rotary kiln has hitherto been regarded as difficult, to make pellets having elacticity, and, also, to make coated-type light weight aggregates easily by burning the pellets in a rotary kiln.

The siliciferous materials usable in the present invention include all sorts of siliciferous materials hitherto known, such as, fly ash, shale, clay, slate, and the like. Of these materials, those which are lacking in plasticity and cohesive property were so far unable to be burnt in a rotary kiln, but it has become possible, by specially applying the present invention, to burn them in a rotary kiln.

Hereunder, an explanation is given as to sludge from a sewage-treating plant that is to be mixed with a siliciferous material. The treatment of sewage by an activated sludge process which is at present most widely adopted consists in separating the sewage collected in a sewage-treating plant into raw sludge and clean water by means of activated sludge. The raw sludge is then usually concentrated and thereafter made into digested sludge by the digesting action. The raw sludge or the digested sludge is then aggregated by the addition of ferric chloride and lime, and thereafter filtered by vacuum filtration into wet sludge cake having a water content of about 70%.

As the sludge in the present invention, either raw sludge or digested sludge having a water content of more than 95% may similarly be used, but wet sludge cake having a water content of about 70% is most desirable. The reasons are that the water content of pellets formed of a mixture of the cake with a siliciferous material is suitable, that it is needless to dry the mixture or to add water, and that the iron content in the ferric chloride increases the bloating of pellets. Further, the wet sludge cake may be one made from either raw sludge or digested sludge, but, because digested sludge is utterly harmless, the cake made from digested sludge is recommended for sanitary reasons.

Sludge cake consists of organic and inorganic substances, each occupying about half the amount of the cake, and it has a calorific value of more than 2000 Kcal. Therefore, the mixing of cake with a siliciferous material results in giving advantages such that the resultant pellets are easy to burn, that the fuel required for burning can be economized, and that the ash content resulting from burning combines with the pulverulent body of siliciferous material and remains in the products, so the strength of the products increases.

The amount of wet sludge cake to be mixed with a siliciferous material is preferably within the range of 10–50 wt. percent; particularly, with about 20 wt. percent, the water content of the resultant mixture becomes about 14%, which is very suitable for granulation.

If the addition amount of sludge cake is less than 10 wt. percent, the increase in strength of the pellets is insufficient, and, if the amount is more than 50 wt. percent, the water content of the mixture becomes high so that drying must be effected in case of granulation.

When a mixture of siliciferous material and sludge is granulated into pellets and the pellets are burnt in a rotary kiln, the organic substances in the sludge are burnt up, with the result that the pellets show the lowest value of strength in the vicinity of 600° C. The present inventors found that, for reinforcing the strength at that point, it is effective to add sodium silicate, sodium carbonate, or caustic soda as an auxiliary binder to a mixture of siliciferous material and sludge. The addition amount of such binder is preferably within the range of 1–5 wt. percent of the mixture; with less than 1%, it is ineffective, and, with more than 5%, it is undesirable from the point of cost, although the strength of the pellets increases.

Next, the method of mixing of the above-mentioned raw materials is described hereunder.

As an apparatus for mixing of pulverulent bodies, a variety of mixers are available at present. However, in the present invention, for mixing a siliciferous material with sludge, a mixer having a mulling action based on the spatulate or smearing mechanism must be used; otherwise, good results cannot be obtained. As this type of mixer, a muller having two wide wheels which effect rotational motion on a circular pan is most suitable. It was confirmed by comparison that the pellets formed of raw materials mixed by using the muller had a strength more than two-times that of the pellets formed of the same raw materials mixed by using other mixers such as a ribbon mixer.

In an experiment, the raw materials were mixed up by using the above-mentioned type of muller, the mixture was then granulated into pellets in spherical form of 9–11 mm. in diameter by a pan-type pelletizer, and the pellets were dried and thereafter burnt for 30 minutes at 400° C., 600° C. and 800° C., respectively. The crushing strength, drop impact strength and resistance to pulverization of the resultant pellets were as shown in Tables 1, 2 and 3, respectively.

TABLE 1.—CRUSHING STRENGTH

| Raw material | Percent | Dried body | 400° C. | 600° C. | 800° C. |
|---|---|---|---|---|---|
| Fly ash only | | 600 g. | 250 g. | 75 g. | 120 g. |
| Fly ash<br>Sludge | 80<br>20 | 4.0 kg. | 1.2 kg. | 0.9 kg. | 5.8 kg. |
| Fly ash<br>Sludge<br>Sodium silicate | 76<br>20<br>4 | 5.5 kg. | 1.5 kg. | 1.45 kg. | 6.0 kg |

TABLE 2.—DROP IMPACT STRENGTH

| Raw material | Percent | Dried body, cm. | 400° C. cm. | 600° C. cm. | 800° C. cm. |
|---|---|---|---|---|---|
| Fly ash only | | 15 | 7 | 2 | 30 |
| Fly ash<br>Sludge | 80<br>20 | 98 | 30 | 20 | 90 |
| Fly ash<br>Sludge<br>Sodium silicate | 76<br>20<br>4 | 135 | 35 | 40 | 120 |

TABLE 3.—RESISTANCE TO PULVERIZATION

| Raw material | Percent | Dried body, percent | 400° C., percent | 600° C., percent | 800° C., percent |
|---|---|---|---|---|---|
| Fly ash only | | 60 | 96 | 100 | 100 |
| Fly ash<br>Sludge | 80<br>20 | 2.23 | 9.51 | 11.0 | 4.97 |
| Fly ash<br>Sludge<br>Sodium silicate | 76<br>20<br>4 | 1.3 | 8.80 | 9.48 | 4.80 |

In the above tables, the crushing strength shows the weight of the respective pellet samples of the same size when they were loaded and broken, the drop impact strength shows the height from which the samples were dropped to a concrete floor and broken, and the resistance to pulverization shows the wt. percent of the portion of the samples pulverized in a pot mill after rotation for 5 minutes at 50 r.p.m.

From the above tables, it is clear that the pellets made of fly ash to which sludge or sludge and sodium silicates have been added are several-times higher in strength than the pellets made of only fly ash even at the time of drying or heating. Also, it becomes clear that, as the pellets are heated, the strength thereof decreases, reaching the lowest in the vicinity of 600° C., but, beyond this temperature zone, the strength suddenly increases. Accordingly, in the case of burning the pellets in a rotary kiln, it is possible, by charging them into a zone of the rotary kiln that is heated to above 600° C., to shorten the time of their being maintained at a temperature in the vicinity of 600° C., and, also, to reduce their breakage due to burning to the minimum.

Next, the process of manufacture of light weight aggregates according to this invention is described hereunder.

The raw materials, siliciferous material and sludge cake, are charged into a muller, and, if necessary, sodium silicate is added, followed by mixing them up for 10–30 minutes. At this point, if the water content of the resultant mixture is high, the mixture is dried, and, if the water content is low, water is added. The mixture is then fed into a pan-type pelletizer or extruder, and granulated into pellets of 5–15 mm. in diameter, the pellets being dried in the sun or by utilizing the remaining heat of the rotary kiln. The dried pellets are then charged into a zone of the rotary kiln that is heated to a predetermined temperature, and burnt at about 1100–1300° C., with the result that the pellets bloat and turn into coated-type light weight aggregates.

A preferred working example of the present invention is given hereunder, but is not to be construed to limit the scope of this invention.

EXAMPLE

The composition of the respective fly ash, shale and clay used in this example was as shown in Table 4, and the particle distribution of the fly ash was as shown in Table 5. The sludge used was sludge cake obtained by vacuum filtration of digested sludge and which had a water content of 70%, and the sodium silicate used was waterglass having a specific gravity of Bé. 40°. As the blender, use was made of a muller having a diameter of 130 cm., and, as the pelletizer, use was made of a pan-type pelletizer having a diameter of 100 cm. The rotary kiln used had an overall length of 7 m. and an inner diameter of 40 cm., the rotary kiln effecting rotation once per minute and being provided with a supply port for supplying pellets into a zone of the kiln where the inside temperature was kept at about 650° C. The time for the pellets to stay in the rotary kiln was about 30 minutes.

The above-mentioned raw materials, of which the shale and the clay had been pulverized into 100 mesh particles respectively, were mixed up in the above-mentioned muller, and the resultant mixture was granulated by the above-mentioned pelletizer into pellets of 10 mm. in diameter, which were dried and thereafter charged into the above-mentioned rotary kiln.

The quality of the light weight aggregates thus obtained was measured, the results being as shown in Table 6. Incidentally, in no case, was pulverization or breakage of the pellets observed during burning.

TABLE 4

| | Fly ash, percent | Shale, percent | Clay percent |
|---|---|---|---|
| $SiO_2$ | 52.6 | 63.5 | 46.8 |
| $AlO_3$ | 29.0 | 15.7 | 37.5 |
| $Fe_2O_3$ | 5.1 | 2.4 | 1.4 |
| $C_2O$ | 4.5 | 4.0 | 0.5 |
| $MgO$ | 1.6 | 2.0 | 0.2 |
| $No_2O$ | 1.4 | 1.5 | |
| $K_2O$ | 1.0 | 1.7 | |
| Ignition loss | | 7.2 | 12.8 |

TABLE 5

Particle distribution of fly ash

| | Percent |
|---|---|
| Less than 150 mesh | 12 |
| 150–250 mesh | 25 |
| 250–325 mesh | 26 |
| More than 325 | 37 |

TABLE 6

| Sample Number | Siliciferous material | Percent | Sludge cake, percent | Sodium silicate, percent | Burning temperature, °C. | Specific Specific gravity | Water absorption, percent | Crushing strength kg. |
|---|---|---|---|---|---|---|---|---|
| 1 | Fly ash | 85 | 15 | | 1,200 | 1.28 | 3.0 | 65 |
| 2 | do | 80 | 20 | | 1,200 | 1.30 | 3.2 | 60 |
| 3 | do | 80 | 18 | 2 | 1,200 | 1.32 | 3.6 | 52 |
| 4 | do | 70 | 30 | | 1,180 | 1.35 | 4.2 | 70 |
| 5 | do | 70 | 27 | 3 | 1,180 | 1.32 | 4.4 | 55 |
| 6 | Shale | 80 | 20 | | 1,210 | 1.35 | 4.2 | 50 |
| 7 | do | 70 | 30 | | 1,210 | 1.34 | 4.0 | 66 |
| 8 | Clay | 80 | 20 | | 1,230 | 1.40 | 3.8 | 72 |

For testing purposes, concrete blocks were made by using the light weight aggregates of Sample No. 2 in the above-mentioned example in the compounding ratio mentioned in Table 7 below:

TABLE 7

| | Kg. |
|---|---|
| Portland cement | 360 |
| Light weight aggregates | 442 |
| Sand | 816 |
| Water | 188 |

After the lapse of 28 days, a compressive load test was made of these concrete blocks, with the result that it was confirmed that they had a compressive strength of 300 kg./cm.$^2$.

What is claimed is:

1. A method for the manufacture of coated-type light weight aggregates used for the manufacture of concrete which comprises the steps of
    mixing 50–90% by weight of siliciferous material with 10–50% by weight of sludge cake,
    granulating the resultant mixture into pellets, drying said pellets, and
    thereafter burning said pellets in a rotary kiln for about 30 minutes at about 1200° C.

2. The method, as set forth in claim 1, wherein said siliciferous material is a material selected from the group consisting of fly ash, shale, slate and clay.

3. The method as set forth in claim 1, wherein said mixing of said siliciferous material with said sludge cake is carried out by using a muller.

4. The method, as set forth in claim 1, wherein said dried pellets are charged into a zone of the rotary kiln that is heated to at least 600° C.

5. A method for the manufacture of coated-type light weight aggregates used for the manufacture of concrete which comprises the steps of
    mixing 50–90% by weight of siliciferous material, 10–50% by weight of sludge cake, and 1–5% by weight of sodium silicate,
    granulating the resultant mixture into pellets,
    drying the pellets, and
    thereafter burning said pellets in a rotary kiln for about 30 minutes at about 1200° C.

6. The method, as set forth in claim 5, wherein said siliciferous material is a material selected from the group consisting fly ash, shale, slate and clay.

7. The method, as set forth in claim 5, wherein said mixing of said siliciferous material with said sludge cake is carried out by using a muller.

8. The method, as set forth in claim 5, wherein said dried pellets are charged into a zone of the rotary kiln that is heated to at least 600° C.

References Cited

UNITED STATES PATENTS

| 3,396,952 | 8/1968 | Jennrich et al. | 263—52 |
| 3,442,498 | 5/1969 | Davis | 263—53 |

JOHN J. CAMBY, Primary Examiner